US011080123B2

(12) United States Patent
Nakatani et al.

(10) Patent No.: US 11,080,123 B2
(45) Date of Patent: Aug. 3, 2021

(54) INFORMATION PROCESSING APPARATUS

(71) Applicant: FUJIFILM Business Innovation Corp., Tokyo (JP)

(72) Inventors: Toru Nakatani, Kanagawa (JP); Koji Hashimoto, Kanagawa (JP); Haruki Matsui, Kanagawa (JP); Takeshi Ogura, Kanagawa (JP); Aiko Nozue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 85 days.

(21) Appl. No.: 16/161,062

(22) Filed: Oct. 16, 2018

(65) Prior Publication Data

US 2019/0121688 A1  Apr. 25, 2019

(30) Foreign Application Priority Data

Oct. 25, 2017 (JP) .............................. JP2017-206649

(51) Int. Cl.
*G06F 11/07* (2006.01)

(52) U.S. Cl.
CPC ...... *G06F 11/0778* (2013.01); *G06F 11/0709* (2013.01); *G06F 11/0751* (2013.01)

(58) Field of Classification Search
CPC .................................................. G06F 11/0778

USPC ....................................................... 714/45, 48
See application file for complete search history.

(56) References Cited

U.S. PATENT DOCUMENTS

| 2009/0161143 | A1* | 6/2009 | Nakamoto | ......... H04N 1/32625 |
| | | | | 358/1.14 |
| 2009/0254780 | A1* | 10/2009 | Mizuno | ............... G06F 11/3476 |
| | | | | 714/48 |
| 2015/0095488 | A1* | 4/2015 | Sutou | .................. G06F 11/3404 |
| | | | | 709/224 |
| 2018/0349213 | A1* | 12/2018 | Antony | ............... G06F 11/0766 |

FOREIGN PATENT DOCUMENTS

JP 2006236231 9/2006

* cited by examiner

*Primary Examiner* — Chae M Ko
(74) *Attorney, Agent, or Firm* — JCIPRNET

(57) ABSTRACT

An information processing apparatus includes a memory that stores on a storage unit a log related to an operation performed on a device that is a monitoring target, and an instruction unit that, if a fault occurs in the monitoring target device in response to an operation performed by an operator, gives an instruction to the memory to change an amount of memory of the log stored on the memory from a first amount of memory to a second amount of memory different from the first amount of memory, and if the fault re-occurs in response to the operation subsequent to the instruction, instructs the memory to change the amount of memory of the log from the second amount of memory back to the first amount of memory.

9 Claims, 9 Drawing Sheets

FIG. 4

| LOG LEVEL | GENERATED LOG |
|---|---|
| FATAL | INFORMATION ON FAULT IS GENERATED AS LOG IF FATAL FAULT OCCURS |
| ERROR | INFORMATION ON FAULT IS GENERATED AS LOG IF FAULT OTHER THAN FATAL FAULT OCCURS |
| WARN | INFORMATION ON PROBLEM IS GENERATED AS LOG IF PROBLEM AT LEVEL OF CAUTION OR WARN OCCURS |
| INFO | INFORMATION ON OPERATION IS GENERATED AS LOG IF OPERATOR HAS PERFORMED OPERATION |
| DEBUG | DETAILED INFORMATION FOR DEBUGGING IS GENERATED AS LOG |
| TRACE | DETAILED INFORMATION FOR TRACE IS GENERATED AS LOG |

FIG. 7A

| TIME AND DATE | LOG LEVEL | INFORMATION |
|---|---|---|
| 2017/07/28 14:30:23 | INFO | OPERATION ID: 1<br>RESULT CODE: ERROR |

FIG. 7B

| TIME AND DATE | LOG LEVEL | INFORMATION |
|---|---|---|
| 2017/07/28 14:31:00 | INFO | OPERATION ID: 2<br>RESULT CODE: ERROR |
| 2017/07/28 14:31:00 | DEBUG | ERROR DETAIL INFORMATION |

FIG. 7C

| TIME AND DATE | LOG LEVEL | INFORMATION |
|---|---|---|
| 2017/07/28 14:32:00 | INFO | OPERATION ID: 1<br>RESULT CODE: FINISH |

FIG. 7D

| TIME AND DATE | LOG LEVEL | INFORMATION |
|---|---|---|
| 2017/07/28 14:33:00 | INFO | OPERATION ID: 1<br>RESULT CODE: ERROR |
| 2017/07/28 14:33:00 | DEBUG | ERROR DETAIL INFORMATION |

FIG. 8A

| OPERATION ID | ERROR COUNT |
|---|---|
| 1 | 10 |

FIG. 8B

| OPERATION ID | ERROR COUNT |
|---|---|
| 1 | 9 |

INFORMATION PROCESSING APPARATUS

CROSS-REFERENCE TO RELATED APPLICATIONS

This application is based on and claims priority under 35 USC 119 from Japanese Patent Application No. 2017-206649 filed Oct. 25, 2017.

BACKGROUND

(i) Technical Field

The present invention relates to an information processing apparatus.

(ii) Related Art

Logs related to an operation performed on a device as a monitoring target may be collected, and a study may be made on faults having occurred in the device. In related art techniques, while the device is working, a fault that has occurred in response to an operator's operation may be repeated. In such a case, detailed logs are acquired. When the acquisition of the detailed logs is performed no longer, a process to revert back to an original state on the device is difficult.

SUMMARY

According to an aspect of the invention, there is provided an information processing apparatus. The information processing apparatus includes a memory that stores on a storage unit a log related to an operation performed on a device that is a monitoring target, and an instruction unit that, if a fault occurs in the monitoring target device in response to an operation performed by an operator, gives an instruction to the memory to change an amount of memory of the log stored on the memory from a first amount of memory to a second amount of memory different from the first amount of memory, and if the fault re-occurs in response to the operation subsequent to the instruction, instructs the memory to change the amount of memory of the log from the second amount of memory back to the first amount of memory.

BRIEF DESCRIPTION OF THE DRAWINGS

Exemplary embodiment of the present invention will be described in detail based on the following figures, wherein:

FIG. 4 illustrates an example of a log level;

FIG. 7A through FIG. 7D illustrate structures of logs acquired from a log reading unit;

FIG. 8A and FIG. 8B illustrate examples of an error table; and

DETAILED DESCRIPTION

Exemplary embodiment of the present invention is described in detail below in connection with the drawings.

Figure 1:
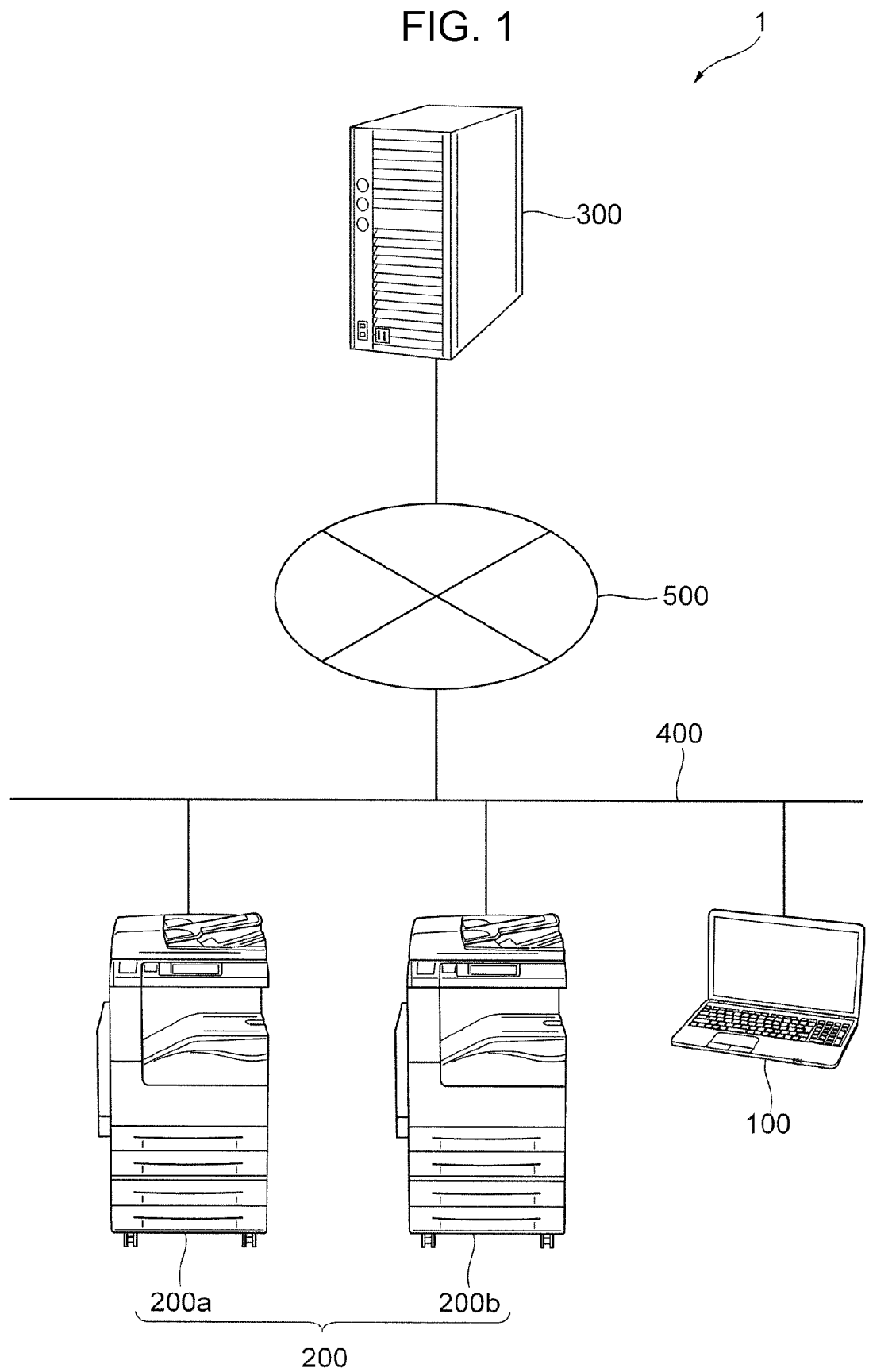
FIG. 1 illustrates a whole configuration of an information processing apparatus of the exemplary embodiment.

The whole configuration of an information processing system 1 of the exemplary embodiment is described below. FIG. 1 illustrates the whole configuration of the information processing system 1 of the exemplary embodiment. Referring to FIG. 1, in the information processing system 1, a management terminal 100, and devices 200a and 200b are connected to a network 400. An information management server 300 is connected to a network 500. The management terminal 100, and the devices 200a and 200b are connected to the information management server 300 via the network 400 and the network 500.

FIG. 1 illustrates the devices 200a and 200b. When the devices 200a and 200b are not discriminated from each other, they may be collectively referred to as a device 200. In the example of FIG. 1, two devices 200 are illustrated, but the number of devices is not limited to two.

The management terminal 100 serving as an example of an information processing apparatus manages the device 200, and may be a personal computer (PC), for example. An application managing the device 200 (hereinafter referred to as a management application) has been installed on the management terminal 100. The device 200 is thus managed by the management application.

More specifically, the management terminal 100 acquires from the device 200 information including the model of the device 200, the application installed on the device 200, and a version of that application, and the stores the information thereon. The management terminal 100 also acquires from the server apparatus 300 a variety of applications provided by the server apparatus 300, and information on the applications, and stores the acquired information thereon. The management terminal 100 displays on a screen thereof the information, to an operator, acquired from the device 200 or the server apparatus 300. Further, the management terminal 100 downloads the application from the server apparatus 300, and installs the downloaded application onto the device 200. The management terminal 100 upgrades the version of the application installed on the device 200, or uninstalls the application on the device 200. Via the management application, the management terminal 100 performs process with the device 200 and the server apparatus 300, thereby managing the device 200.

The device 200 processes data, and may be an image forming apparatus having a functionality to form an image on a recording medium via an electrophotographic system or an ink-jet system. The device 200 is not limited to the image forming apparatus, but may also be a PC or a portable information terminal.

The information management server 300 manages applications (products) to be provided to the device 200 and information on the applications. The information management server 300 may be a PC, a workstation, or the like. In response to a request from the management terminal 100, the information management server 300 transmits to the management terminal 100 an application or information on an application that is available to the management terminal 100. The information on the applications transmitted by the information management server 300 may include the name of an available application, the version of the application, the release date of the application, and the model of the device 200 that is supported by the application. The file of the application may be stored on a device other than the information management server 300. In such a case, the information management server 300 manages information on a uniform resource location (URL) of the installer of the application.

The network 400 is a communication system that is used for communication between the management terminal 100 and the device 200. For example, the network 400 may be a local area network (LAN).

The network 500 is a communication system that is used for communication among the management terminal 100, the device 200, and the information management server 300. The network 500 may be the Internet or a public telephone network.

Figure 2:
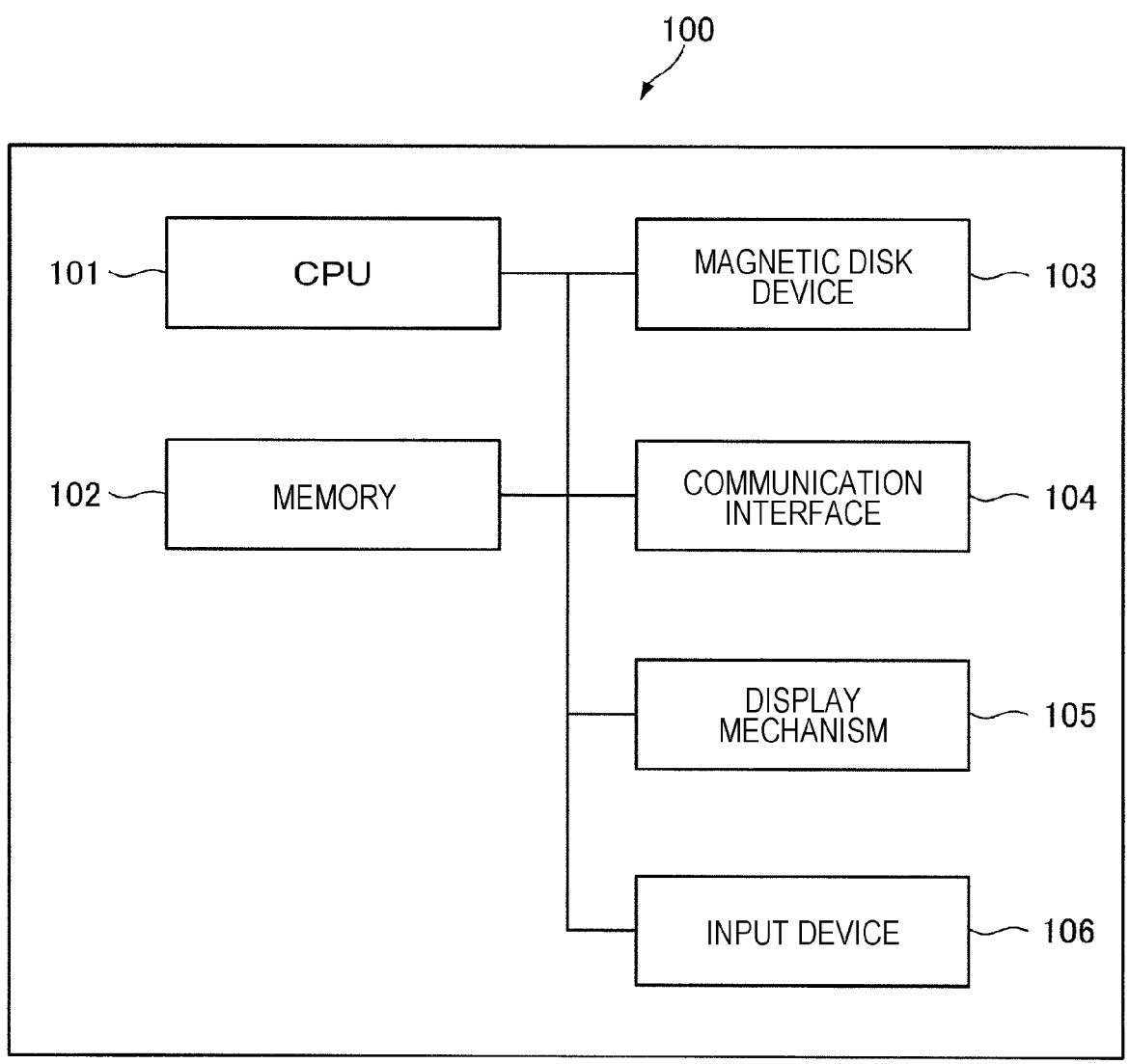
FIG. 2 illustrates a hardware configuration of a management terminal of the exemplary embodiment.

The hardware configuration of the management terminal 100 of the exemplary embodiment is described below. FIG. 2 illustrates the hardware configuration of the management terminal 100 of the exemplary embodiment.

Referring to FIG. 2, the management terminal 100 includes a central processing unit (CPU) 101 serving as an arithmetic unit, a memory 102, and a magnetic disk device 103. The CPU 101 executes a variety of programs including an operating system (OS), and applications. The memory 102 serves as a memory area that stores the variety of programs and data that is used to execute the programs. The magnetic disk device 103 serves as a memory area that stores the variety of programs, data that is input to the programs, and data that is output from the programs. The CPU 101 implements functionalities of the management terminal 100 by loading the programs stored on the magnetic disk device 103 onto the memory 102, and executing the programs. As described below, the magnetic disk device 103 stores a log related to the operation of a device as a monitoring target.

The management terminal 100 further includes a communication interface 104 for communication with the outside, a display mechanism 105 including a video memory and a display, and an input device 106 including a keyboard, a mouse, and/or a touch panel.

A log generation process of the management terminal 100 of the exemplary embodiment is described below. The management terminal 100 of the exemplary embodiment has a functionality to generate a log related to the management application, and to store the generated log on a memory region thereof. More specifically, the management terminal 100 generates and stores a log on an internal operation performed within the management terminal 100, and a log on an operation of the management application performed with each of the device 200 and the information management server 300. In other words, the management terminal 100 generates the log for a monitoring target device (such as the management terminal 100, the device 200, or the information management server 300), and then stores the generated log on the memory region thereof.

As will be described in greater detail later, a log detail level indicating an amount of log generated (an amount of information) is set in the exemplary embodiment when logs are generated. The management terminal 100 generates a log in accordance with the set log detail level.

Figure 3:
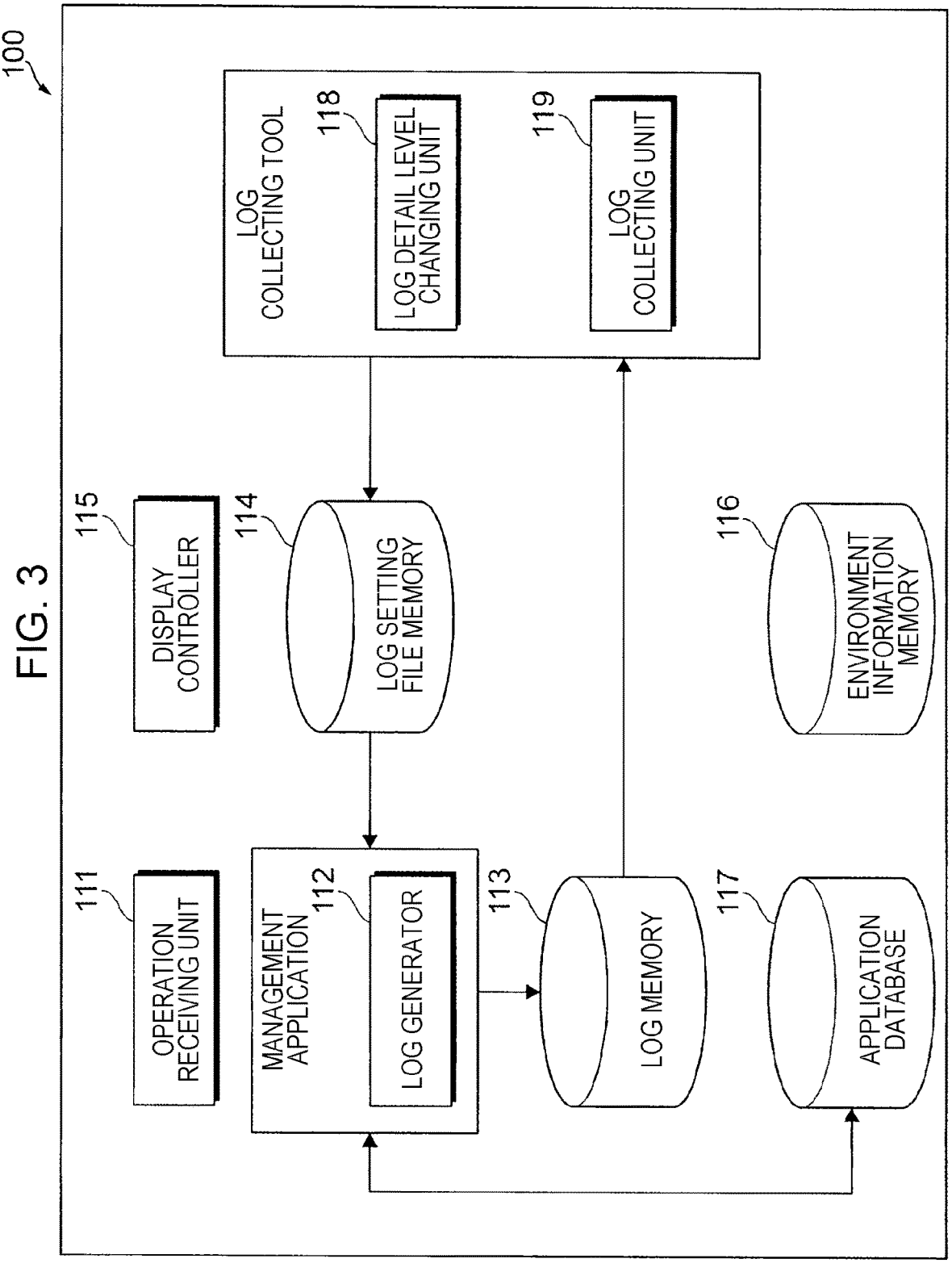
FIG. 3 is a functional block diagram illustrating the management terminal of the exemplary embodiment.

The functional configuration of the management terminal 100 of the exemplary embodiment is described below. FIG. 3 is a functional block diagram illustrating the management terminal 100 of the exemplary embodiment.

The management terminal 100 of the exemplary embodiment includes an operation receiving unit 111, a log generator 112, a log memory 113, a log setting file memory 114, a display controller 115, an environment information memory 116, an application database 117, a log detail level changing unit 118, and a log collecting unit 119. The log generator 112 is implemented by the management application. The log detail level changing unit 118 and the log collecting unit 119 are implemented by an application to collect logs (hereinafter referred to as a log collecting tool).

The operation receiving unit 111 receives an operation performed by an operator. In response to an operation of the operator who uses a touch panel, a mouse, or the like, the operation receiving unit 111 receives an operation to download an application from the information management server 300 or another device, or an operation to install the downloaded application on the device 200. Also, the operation receiving unit 111 receives an operation to start up the log collecting tool.

The log generator 112 generates a log related to the operation of the management application, and stores the generated log on the log memory 113. The log generator 112 references a log setting file stored on the log setting file memory 114, and verifies the log detail level set at the moment. The log generator 112 generates the log in accordance with the set log detail level.

The log memory 113 stores the logs generated by the log generator 112. The log memory 113 store in a sequential order the logs generated by the log generator 112.

The log setting file memory 114 stores a log setting file. The log setting file includes the log detail level currently being set. The log detail level of the log setting file may be changed by the log detail level changing unit 118.

The display controller 115 controls the display by outputting data that displays an image on a display of the display mechanism 105. More specifically, the display controller 115 displays screens generated by the management application, including a screen that receives an operation to download an application from the information management server 300 or another device, and a screen that receives an operation to install the downloaded application to the device 200. The display controller 115 also displays screens generated by the log collecting tool, including a screen that receives an operation to start collecting logs, and a screen that indicates a progress of log collection.

The environment information memory 116 stores environment information of the management terminal 100. The environment information of the management terminal 100 is information on hardware and software of the management terminal 100, and, for example, includes an Internet protocol (IP) address and a host name of the management terminal 100, and an operating system (OS) and information on a memory mounted on the management terminal 100. More specifically, the environment information is information that is acquired by Windows (registered trademark) command, such as an "ipconfig" command and a "systeminfo" command.

The application database 117 stores a variety of information to be managed by the management terminal 100. As described above, the application database 117 stores information related the device 200, such as the model of the device 200, and information on an application provided by the information management server 300. Writing data to or reading data from the application database 117 is performed by the management application or the like.

The log detail level changing unit 118 changes the log detail level of the log setting file stored on the log setting file memory 114. The log detail level changing unit 118 acquires a log from the log memory 113 and based on the acquired log, determines whether a fault (error) has occurred. If the log detail level changing unit 118 determines that a fault is caused by an operator's operation, the log detail level changing unit 118 changes the log detail level. After changing the log detail level, the log detail level changing unit 118 determines whether the fault has re-occurred in response to the operator's operation. If the log detail level changing unit 118 determines that the fault has re-occurred in response to the operator's operation, the log detail level changing unit 118 reverts the log detail level back to the original state thereof.

By changing the log detail level in this way, the log detail level changing unit 118 changes an amount of logs generated by the log generator 112 (namely, an amount of logs stored on the log memory 113). It will be understood that changing the log detail level is an instruction to instruct the log generator 112 to change an amount of logs in the generation operation thereof.

The log collecting unit 119 collects the logs stored on the log memory 113. The log collecting unit 119 creates a single log file by archiving the collected logs. The management terminal 100 outputs the created log file to an external device to study the fault.

Each functionality of the management terminal 100 is implemented when software works in concert with hardware. More specifically, the management terminal 100 has the hardware configuration of FIG. 2. The OS, the management application, and the log collecting tool are then read from the magnetic disk device 103 or the like onto the memory 102, and the CPU 101 executes the OS, the management application, and the log collecting tool. In this way, the CPU 101 implements the functionalities of the operation receiving unit 111, the log generator 112, the display controller 115, the log detail level changing unit 118, and the log collecting unit 119. The log memory 113, the log setting file memory 114, the environment information memory 116, and the application database 117 may be implemented by the magnetic disk device 103 or the like.

In accordance with the exemplary embodiment, the log detail level changing unit 118 may be implemented, not by the log collecting tool but by another program, such as the management application. In accordance with the exemplary embodiment, the log generator 112 may be used as an example of a memory. The log memory 113 may also be used as an example of a storage unit. The log detail level changing unit 118 may be used an example of an instruction unit.

The log detail level set in the log setting file is described below. The log detail level may be set in accordance with multiple predetermined log levels. The log level is associated in advance with each event that may happen on the management terminal 100. In other words, each event that may happen on the management terminal 100 is associated with one or more log levels, and if an event happens, the log is generated at a log level associated with the event.

FIG. 4 illustrates an example of log levels. Referring to FIG. 4, six log levels including "FATAL", "ERROR", "WARN", "INFO", "DEBUG", and "TRACE". These log levels are sorted at six levels, according to the degree of importance, for example. For example, a log generated at the log level "FATAL" has the highest degree of importance, and logs generated at the log levels "ERROR", "WARN", "INFO", "DEBUG", and "TRACE" have the degrees of importance from high to low in that order.

The log level "FATAL" means that information on a fault is generated as a log when a fatal fault occurs. The log level "ERROR" means that information on a fault is generated as a log when another fault that is not fatal occurs. The log level "WARN" means that information on a problem is generated as a log when a problem at a caution or warn level occurs. The log level "INFO" means that information on an operation is generated as a log when an operator performs an operation.

The log level "DEBUG" means that detailed information for debugging is generated as a log. The information generated at the log level "DEBUG" includes information on an application acquired from the device 200 when the management terminal 100 communicates with the device 200, and information on a process that is performed between the management terminal 100 and the device 200 when an application is installed on the device 200. The information generated at the log level "DEBUG" further includes information on an application acquired from the information management server 300 when the management terminal 100 communicates with the information management server 300, and information on an input and output process performed with the application database 117. If a fault occurs in response to an operator's operation, information on the fault is generated as a log "DEBUG". The log level "TRACE" means that detailed information for tracing is generated as a log, and includes information more detailed than the detailed information for debugging.

Whether a fault that occurs during the operation of the management application is a fatal fault at the log level "FATAL" or other fault not fatal and at the log level "ERROR" is predetermined. What information to generate on each fault is also predetermined. Similarly, events corresponding to the log levels "WARN", "INFO", "DEBUG", and "TRACE" are predetermined. What information to generate on each event as a log is predetermined.

In accordance with the exemplary embodiment, two log detail levels of "coarse" and "fine" are present for each log level. If the log detail level is "coarse", the log at the log level corresponding to "coarse" is generated. If the log detail level is "fine", the log at the log level corresponding to "fine" is generated. More in detail, in the case of the log detail level "coarse", "INFO" is specified as a log level. In that case, logs at the log levels "FATAL", "ERROR", "WARN", and "INFO" are generated. In the case of the log detail level "fine", "DEBUG" is specified as the log level. In that case, logs at the log levels "FATAL", "ERROR", "WARN", "INFO", and "DEBUG" are generated. More specifically, the log detail level is changed from "coarse" to "fine", a log at the log level "DEBUG" is newly generated in addition to the logs at the log levels "FATAL", "ERROR", "WARN", and "INFO" that have been generated at the log detail level "coarse". The amount of generated logs thus increases.

In addition, the log generator 112 determines what log level an event, such as a fault or an operator's operation, is at when the event has occurred. The log generator 112 references the log setting file stored on the log setting file memory 114 to verify the log detail level set at the moment. For example, if an event having the log level "INFO" occurs with the log detail level "coarse", the log generator 112 generates a log of that event. On the other hand, if an event having the log level "DEBUG" occurs with the log detail level "coarse", the log generator 112 does not generate a log of that event. If an even at the log level "INFO" or "DEBUG" occurs with the log detail level of "fine", the log generator 112 generates a log of that event.

If an event associated with multiple log levels occurs, logs respectively corresponding to the log levels are generated. For example, a fault occurring in response to an operation of the operator may now be associated with "FATAL" and "DEBUG". If the fault occurs with the log detail level "coarse", a log at the lot level "FATAL" is generated. For example, information, such as the name of the fault, and the type of the fault, is generated as a log at the lot level "FATAL". If the fault occurs with the log detail level "fine", a log at the log level "DEBUG" is generated while a log at the log level "FATAL". In such a case, generated as the log at the log level "DEBUG" is information including the application and module where the fault occurs, and the process that is in progress at the occurrence of the fault is. Since the fault occurs in response to the operator's operation, the log at the log level "INFO" indicating the information on the operator's operation is also generated.

During a normal operation mode in accordance with the exemplary embodiment, the log detail level "coarse" is set such that the log is generated in a minimum amount to reduce an amount of use of the log memory 113. If a fault occurs in response to the operator's operation, the log detail level changing unit 118 changes the log detail level from "coarse" to "fine". If the fault re-occurs later, a log is generated at the occurrence of the fault with the log detail level "fine". By collecting the logs with the log collecting tool, the logs at the occurrence of the fault with the log detail level "fine" are collected. Thus, more information useful to study the fault is acquired than when the logs are collected with the log detail level "coarse".

If the fault further re-occurs, the log detail level changing unit 118 changes the log detail level from "fine" to "coarse". By changing the log detail level from "fine" to "coarse", the generation of logs unuseful for studying the fault is controlled more than when the log detail level "fine" remains unchanged. In accordance with the exemplary embodiment, an example of a first amount of memory is an amount of memory in a "coarse" state, and an example of a second amount of memory is an amount of memory in a "fine" state.

Figure 5:
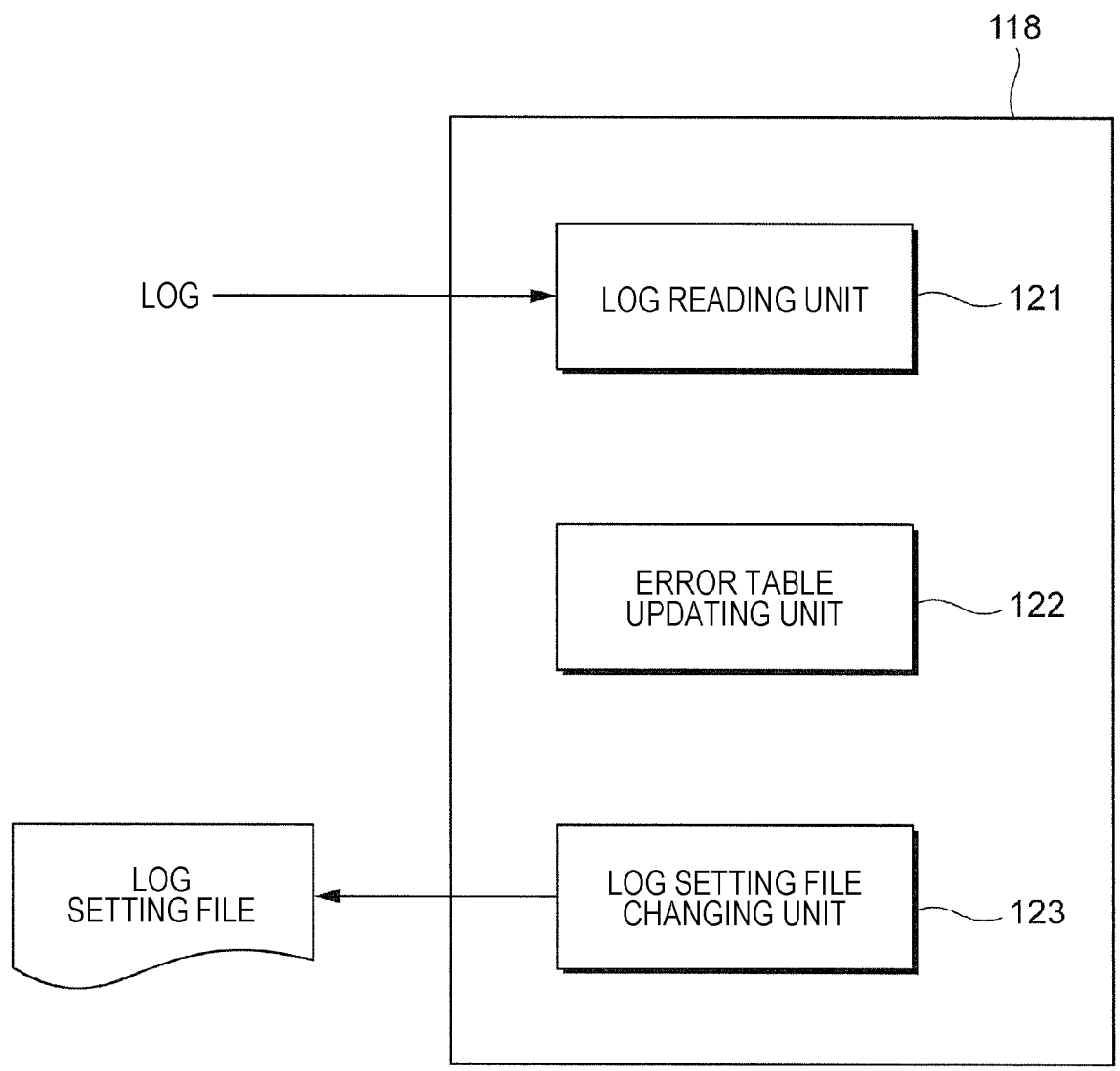
FIG. 5 is a block diagram illustrating a configuration of a log detail level changing unit.

The configuration of the log detail level changing unit 118 is described in detail below. FIG. 5 is a block diagram illustrating the configuration of the log detail level changing unit 118. The log detail level changing unit 118 includes a log reading unit 121, an error table updating unit 122, and a log setting file changing unit 123.

The log reading unit 121 reads a log stored on the log memory 113. The read log is output to the error table updating unit 122.

The error table updating unit 122 determines whether an operator's operation has been recorded in the log acquired from the log reading unit 121. If the operator's operation has been recorded, the error table updating unit 122 determines, based on the acquired log, whether a fault (an error) has occurred in response to the operator's operation. If the error table updating unit 122 determines that a fault (an error) has occurred in response to the operator's operation, and the log detail level is "coarse", the error table updating unit 122 instructs the log setting file changing unit 123 to change the log detail level from "coarse" to "fine". The error table updating unit 122 also registers the operator's operation causing the fault in an error table. The error table is used to manage the operator's operation causing the fault. The operation registered in the error table is managed in the error table until the fault re-occurs. In other words, the operation registered in the error table is expected to repeat the fault.

In addition, while the operator's operation remains registered in the error table, the log detail level is set to be "fine". For that reason, if the fault re-occurs in response to the operator's operation that has been registered in the error table, the log at the occurrence of the fault responsive to the operation is generated with the log detail level "fine". More specifically, more information than in the state of the log detail level "coarse" is generated about the fault. In such a case, the error table updating unit 122 deletes the operation form the error table, and excludes it as the management target. If a predetermined condition is satisfied without the fault re-occurring responsive to the operation registered in the error table, for example, if the fault does not occur even though the operation has been repeated by a predetermined number of times, the error table updating unit 122 deletes the operation from the error table.

The error table updating unit 122 manages the operator's operation responsive to the fault in the error table. If the operator's operation is registered in the error table, the log detail level is set to be "fine". If the operator's operation registered in the error table is not present any longer (in other words, an operation as a management target is no longer present), the error table updating unit 122 instructs the log setting file changing unit 123 to change the log detail level from "fine" to "coarse".

Based on the instruction from the error table updating unit 122, the log setting file changing unit 123 changes the log detail level of the log setting file from "coarse" to "fine" or from "fine" to "coarse".

Figure 6:
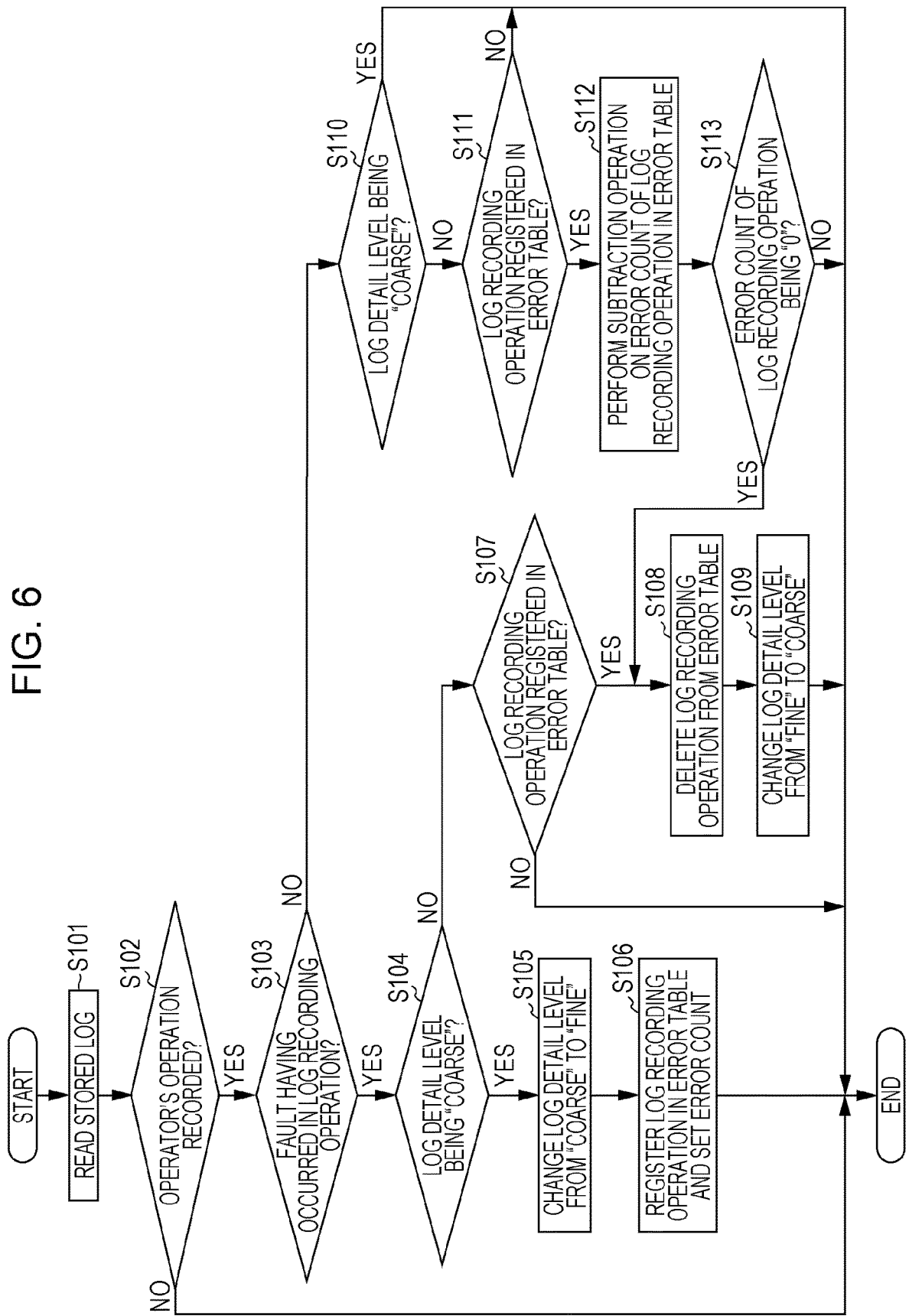
FIG. 6 is a flowchart illustrating an example of a process of the log detail level changing unit that changes a log detail level.

A process of the log detail level changing unit 118 that changes the log detail level is described below. FIG. 6 is a flowchart illustrating an example of the process of the log detail level changing unit 18 that changes the log detail level. Referring to FIG. 6, the process is performed periodically (every minute, for example), or at a timing a log is newly stored on the log memory 113.

The log reading unit 121 reads a log from the log memory 113 (step S101). The read log is output to the error table updating unit 122. The error table updating unit 122 determines whether the operator's operation is recorded in the log acquired from the log reading unit 121 (step S102). If the determination result in step S102 is non-affirmative (no), the process ends. If the determination result in step S102 is affirmative (yes), in other words, if the operator's operation is recorded in the log, processing proceeds to step S103. In the discussion that follows, the operator's operation recorded in the log may also referred to as a "log recording operation".

The error table updating unit 122 determines, based on the acquired log, whether a fault has occurred in response to the log recording operation (step S103). If the determination result in step S103 is affirmative (yes), processing proceeds to step S104. On the other hand, if the determination result in step S103 is non-affirmative (no), processing proceeds to step S110.

If the determination result in step S103 is affirmative (yes) in step S103, the error table updating unit 122 determines in step S104 whether the log detail level of the log setting file is "coarse" (step S104).

If the determination result in step S104 is affirmative (yes), the error table updating unit 122 instructs the log setting file changing unit 123 to change the log detail level of the log setting file from "coarse" to "fine". In response to the instruction, the log setting file changing unit 123 changes the log detail level from "coarse" to "fine" (step S105). The error table updating unit 122 also registers in the error table the log recording operation (namely, the operator's operation that is in step S103 determined to cause the fault) and sets an error count as an integer equal to or above 1 (step S106). The process thus ends.

If the determination result in step S104 is non-affirmative (no), the log detail level is set to be "fine". In such a case, the error table updating unit 122 determines whether the log recording operation (namely, the operator's operation that is in step S103 determined to cause the fault) is registered in the error table (step S107).

If the determination result in step S107 is affirmative (yes), the fault re-occurs in response to the log recording operation and a log at the occurrence of the fault is generated with the log detail level "fine". The error table updating unit 122 deletes the log recording operation from the error table (step S108). The error table updating unit 122 instructs the log setting file changing unit 123 to change the log detail level of the log setting file from "fine" to "coarse". In response to the instruction, the log setting file changing unit 123 changes the log detail level from "fine" to "coarse" (step S109). The process thus ends.

If the determination result in step S107 is non-affirmative (no), the process ends. The non-affirmative determination result in step S107 means that the fault occurs in response to the operator's operation not registered in the error table with the log detail level "fine". Since in such a case, a log at the occurrence of the fault is generated with the log detail level "fine", the operator is free from causing the fault to re-occur by performing the same operation. The operator's operation in this case is not registered in the error table.

If the determination result in step S103 is non-affirmative (no), the error table updating unit 122 determines in step S110 whether the log detail level of the log setting file is "coarse" (step S110). If the determination result in step S110 is affirmative (yes), the process ends. In other words, the log detail level remains "coarse". On the other hand, if the determination result in step S110 is non-affirmative (no), the error table updating unit 122 determines whether the log recording operation (namely, the operator's operation that is determined in step S103 to cause the fault) is registered in the error table (step S111).

If the determination result in step S111 is non-affirmative (no), the process ends. On the other hand, if the determination result in step S111 is affirmative (yes), the error table updating unit 122 performs a subtraction operation on the error count of the log recording operation in the error table (step S112). More specifically, the error table updating unit 122 decrements the error count of the log recording operation by "1".

The error table updating unit 122 determines whether the error count of the log recording operation is "0" (step S113). If the determination result in step S113 is affirmative (yes), processing proceeds to step S108. If the log recording operation has been performed by a predetermined number of times, and no fault occurs (in other words, the fault is not repeated even if the log recording operation is performed by the number of times equal to the error count), the log recording operation is deleted from the error table. In step S109, the log detail level is changed from "fine" to "coarse". On the other hand, If the determination result in step S113 is non-affirmative (no), the process ends. In such a case, the log recording operation has not yet been performed by the predetermined number of times, and is thus handled continuously as the operation serving as a management target.

If multiple operations of the operator have been recorded in the log acquired from the log reading unit 121 in step S102, the process of FIG. 6 is performed on each of the operations recorded in the log.

The changing process of the log detail level performed by the log detail level changing unit 118 is specifically described. In the discussion that follows, in the initial setting, the log detail level of the log setting file is set to be "coarse" and the operator's operation is not registered in the error table. Steps described below correspond to the steps of FIG. 6.

The log reading unit 121 reads a log stored on the log memory 113 (step S101), and outputs the read log to the error table updating unit 122. The error table updating unit 122 determines whether the operator's operation has been registered in the acquired log (step S102).

FIG. 7A through FIG. 7D illustrate the structure of logs stored on the log memory 113 (step S101). Time and date indicate the time and date on which the log has been generated. The "log level" is the one associated with the log. "Information" is information included in the log.

The log of FIG. 7A is acquired by the log reading unit 121. Referring to FIG. 7A, a log having the log level "INFO" has been generated, and the information on the log includes an "operation identifier (ID)", and a "result code". The "operation ID" is an identifier identifying the operator's operation, and the "result code" indicates whether the operation has been normally completed. In this example, the "operation ID" is "1", and the "result code" is "ERROR". The operator's operation indicating the "operation ID" of "1" indicates that a fault has occurred in response to the operator's operation.

The error table updating unit 122 thus determines that the operator's operation indicating the "operation ID" of "1" has been recorded (yes branch from step S102). The error table updating unit 122 determines that a fault has occurred in response to the operator's operation (yes branch from step S103). Since the log detail level is "coarse" (yes branch from step S104), the log setting file changing unit 123 changes the log detail level from "coarse" to "fine" (step S105).

The error table updating unit 122 registers the operation having the "operation ID" of "1" in the error table and sets the error count (step S106). FIG. 8A and FIG. 8B illustrate examples of the error table. Referring to FIG. 8A, an error count "10" is set in connection with the operation having the "operation ID" of "1".

The log detail level of the log setting file is changed from "coarse" to "fine" in this way. Through the succeeding process, a log is generated with the log detail level "fine". More specifically, the log generator 112 generates logs of log levels "FATAL", "ERROR", "WARN", "INFO", and "DEBUG".

The log reading unit 121 continuously reads a log (step S101), and outputs the log to the error table updating unit 122. Referring to FIG. 7B, the log read by the log reading unit 121 having the "operation ID" of "2" and the "result code" of "ERROR" is described below.

In a way similar to the way the fault occurs in response to the operation having the "operation ID" of "1", the determination result in step S102 is affirmative (yes) and the determination result in step S103 is affirmative (yes). Since the log detail level is changed to "fine", the determination result in step S104 is non-affirmative (no). Since the log detail level is "fine", a log having the log level "DEBUG" is generated in connection with the operation having the "operation ID" of "2" as illustrated in FIG. 7B. The log having the log level "DEBUG" includes, as error detail information, information on the fault having occurred in response to the operation having the operation ID of "2". More specifically, since the log at the occurrence of the fault with the log detail level "fine" is generated, the operator is free from causing the fault to re-occur.

The log reading unit 121 continuously reads a log (step S101), and outputs the log to the error table updating unit 122. Referring to FIG. 7C, the log read by the error table updating unit 122 having the "operation ID" of "1" and the "result code" of "FINISH" is described below. The result code of "FINISH" indicates that the operator's operation has been normally completed.

The error table updating unit 122 determines that the operator's operation having the "operation ID" of "1" has been recorded (yes branch from step S102). Since the result code is "FINISH", the error table updating unit 122 determines that no fault has occurred in response to the operator's operation (no branch from step S103).

The log detail level is "fine" (no branch from step S110), and the operation having the operation ID of "1" is registered in the error table as illustrated in FIG. 8A (yes branch from step S111). The error table updating unit 122 performs a subtraction operation on the error count of the operation ID of "1" (step S112). Referring to FIG. 8B, the error count of the operation ID of "1" is decremented to "9" from "10" by "1". Since the error count is not "0" (no branch from step S113), the operation of the operation ID of "1" remains registered in the error table.

The log reading unit 121 continuously reads a log (step S101), and outputs the log to the error table updating unit 122. Referring to FIG. 7D, the log read by the log reading unit 121 having the "operation ID" of "1" and the "result code" of "ERROR" is described below.

The error table updating unit 122 determines that the operator's operation having the "operation ID" of "1" has been recorded (yes branch from step S102). Since the result code is "ERROR", the error table updating unit 122 determines that a fault has occurred in response to the operator's operation (yes branch from step S103). Since the log detail level is "fine", the determination result in step S104 is non-affirmative (no).

Since the operation having the operation ID of "1" is registered in the error table, the determination result in step S107 is affirmative (yes). The fault re-occurs in response to the operation having the operation ID of "1", and the log at the occurrence of the fault is generated with the log detail level "fine". Since the log detail level is "fine", a log at the log level "DEBUG" is generated in response to the operation having the operation ID of "1" as illustrated in FIG. 7D. The log at the log level "DEBUG" includes, as error detail information, information on the fault that has occurred in response to the operation having the operation ID of "1".

The error table updating unit 122 deletes the operation having the operation ID of "1" from the error table (step S108). The log setting changing unit 123 changes the log detail level from "fine" to "coarse" (step S109). If the fault re-occurs in response to the operation having the operation ID of "1", the log at the occurrence of the fault is generated with the log detail level "fine". The log detail level is thus changed from "fine" to "coarse".

In the above discussion, the fault re-occurs in response to the operation having the operation ID of "1". If the operation having the operation ID of "1" has been repeated by 10 times since the registration of the operation having the operation ID of "1" in the error table, all the operations may be normally completed, and no fault may occur. In such a case, the determination result in step S113 is affirmative (yes). The operation having the operation ID of "1" is deleted from the error table (step S108), and the log detail level is changed from "fine" to "coarse".

The error count is set to be "10" in the operation having the operation ID of "1". Alternatively, the error count may be changed on each operation. For example, the error count may be set depending on the frequency of the operation during a normal operation mode, or the degree of importance of the operation, or the type of the operation. More specifically, as the frequency of the operation performed in the normal operation mode increases, the error count may be set to be larger.

In the example described above, the log includes the "operation ID" and the "result code" to identify the operation and to determine the presence or absence of a fault. If the log does not include the "operation ID" and the "result code", a character string identifying the operation or a character string indicating the presence or absence of a fault may be defined in advance.

A fault may occur in response to an operator's operation, and the operator's operation is performed no longer later. A process in such a case is described below. The fault may re-occur in response to the operator's operation or the fault may not occur even if the operator's operation is performed by a predetermined number of times. In such a case, the log detail level is changed from "fine" to "coarse". However, if the operation itself is not performed, the detail information for debugging is repeatedly generated with the log detail level "fine".

The error table updating unit 122 may count the number of the operator's operations not registered in the error table, and if the number of operations counted exceeds a predetermined threshold, the log detail level may be changed from "fine" to "coarse". In the discussion that follows, the operator's operation that is not registered in the error table may also be referred to as an "invalid operation". The invalid operation is not expected to repeat the fault, and in other words, is not related to an operation that is expected to repeat the fault. In accordance with the exemplary embodiment, an example of another operation is the invalid operation. An example of the predetermined condition is that the invalid operations are performed by a predetermined number of times serving as a threshold value.

Figure 9:
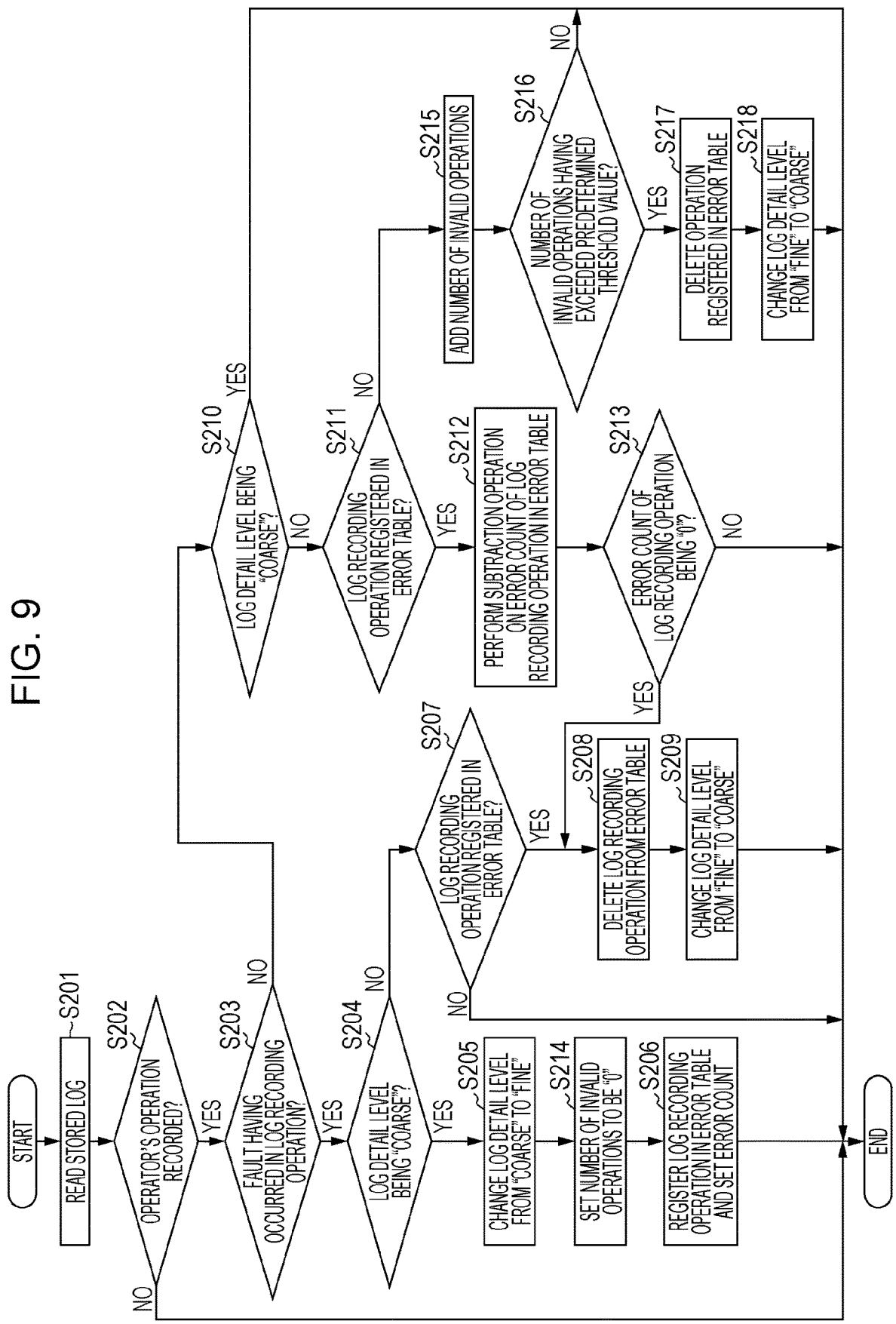
FIG. 9 is a flowchart illustrating a process of counting invalid operations.

FIG. 9 is a flowchart illustrating a process of counting the invalid operations. The process of FIG. 9 is implemented by adding steps S214 through S218 to the process of FIG. 6. The operations in steps S201 through S213 are respectively identical to the operations in steps S101 through S113, and the discussion thereof is omitted herein.

An operation in step S214 is performed subsequent to the operation in step S205. After the log setting file changing unit 123 changes the log detail level from "coarse" to "fine", the error table updating unit 122 resets the number of invalid operations to "0" (step S214).

Operations in steps S215 through S218 are performed if the determination result in step S211 is non-affirmative (no). After it is determined that no fault occurs in the log recording operation (no branch from step S203), and the log detail level is determined to be "fine" (no branch from step S210), the error table updating unit 122 determines whether the log recording operation (namely, the operator's operation that is determined in step S103 to cause the fault) is registered in the error table (step S211).

If the determination result in step S211 is affirmative (yes), an operation in step S212 is performed. On the other hand, if the determination result in step S211 is non-affirmative (no), an operation in step S215 is performed.

In step S215, the error table updating unit 122 adds the number of invalid operations (step S215). More specifically, the error table updating unit 122 increments the number of invalid operations by "1". The error table updating unit 122 determines whether the number of invalid operations exceeds a predetermined threshold value (step S216). If the determination result in step S216 is non-affirmative (no), the process ends. On the other hand, if the determination result in step S216 is affirmative (yes), the error table updating unit 122 deletes the operation registered in the error table (step S217). The error table updating unit 122 instructs the log setting file changing unit 123 to change the log detail level from "fine" to "coarse". In response to the instruction, the log setting file changing unit 123 changes the log detail level from "fine" to "coarse" (step S218). The process thus ends.

If the number of invalid operations exceeds the predetermined threshold value, the log detail level is changed from "fine" to "coarse". Even if the operation causing the fault is not performed later, continuous generation of the detail information for debugging as a log is controlled.

Referring to FIG. 9, the operation that is determined to cause no fault, and that is not registered in the error table is an invalid operation. Even if an operation that is determined to cause a fault and that is not registered in the error table may be counted as an invalid operation.

The log detail level is changed from "fine" to "coarse" if the number of invalid operations exceeds the predetermined threshold in the example described above. The condition for changing the log detail level from "coarse" to "fine" is not limited to the one described above. For example, the log detail level may be changed from "fine" to "coarse" when the fault does not re-occur if a predetermined period of time has elapsed since the occurrence of the fault responsive to the operator's operation. In such a case, the condition that the predetermined period of time has elapsed since the occurrence of the fault responsive to the operator's operation is an example of the predetermined condition. In other words, the condition that the predetermined period of time has elapsed since the occurrence of the fault responsive to the operator's operation may be understood as the condition that the predetermined period of time has elapsed since the changing of the log detail level from "coarse" to "fine". For example, if a particular operation, such as suspending the power source of the management terminal 100, is performed without causing the fault to re-occur in response to the operator's operation, the log detail level may be changed from "fine" to "coarse".

In accordance with the exemplary embodiment as described above, if a fault occurs in response to the operator's operation, the log detail level changing unit 118 changes the log detail level from "coarse" to "fine". If the fault re-occurs in response to the operator's operation, the log detail level changing unit 118 changes the log detail level from "fine" to "coarse". If the fault re-occurs in response to the operator's operation, the log at the occurrence of the fault is generated with the log detail level "fine". Useful information to study the fault is thus provided. If the fault re-occurs, the log detail level is changed from "fine" to "coarse". Even if the fault re-occurs after the fault has occurred in response to the operator's operation, the storage of the log unuseful to study the fault is more controlled than when the log detail level "fine" is maintained.

If the fault occurs in response to the operator's operation, the log detail level changing unit 118 may change the log detail level from "coarse" to "fine", based on the condition that the fault has occurred. The condition for changing the log detail level from "coarse" to "fine" is not limited to that condition.

If a fault occurs in response to an operator's operation, the log detail level changing unit 118 may change the log detail level from "coarse" to "fine" on condition that the operator has replied to a message prompting the operator to cause the fault to re-occur. If the fault occurs in response to the operator's operation, the log detail level changing unit 118 may change the log detail level from "coarse" to "fine" on condition that the operator has replied to a message prompting the operator to cause the log collecting tool to start up. The operation of the operator to reply to the message prompting the operator to cause the fault to re-occur or the operation of the operator to reply to the message prompting the operator to cause the log collecting tool to start up may be understood as the operation to cause the fault to re-occur (the operation to start up the re-occurrence of the fault). In other words, if the fault occurs in response to the operator's operation, the log detail level changing unit 118 may change the log detail level from "coarse" to "fine" on condition that the operation to cause the fault to re-occur (the operation to start up the re-occurrence of the fault) is performed by the operator.

If the fault occurs in response to the operator's operation, the log detail level changing unit 118 may change the log detail level from "coarse" to "fine" on condition that the log collecting tool has started up. If the fault occurs in response to the operator's operation, the log detail level changing unit 118 may change the log detail level from "coarse" to "fine" on condition that the operation to change the log detail level has been manually performed by the operator.

As described above, if the fault occurs in response to the operator's operation, the log detail level changing unit 118 changes the log detail level from "coarse" to "fine" on condition that the log collecting tool has started up. In order to reduce the amount of log collected via the log collecting tool, the log detail level changing unit 118 may change the log detail level from "fine" to "coarse" if the fault occurs in response to the operator's operation. As described above, if the fault re-occurs in response to the operator's operation, the log detail level changing unit 118 changes the log detail level from "fine" to "coarse". Alternatively, however, the log detail level changing unit 118 may change the log detail level from "coarse" to "fine". If the amount of log generated in the normal operation mode is desirably increased, the log detail level changing unit 118 may change the log detail level from "coarse" to "fine" if the fault re-occurs in response to the operator's operation.

In the example described above, the log detail level is a two-level system of "coarse" and "fine". The log detail level may be a three-level system. For example, a generated log (an amount of storage) may be quantized into three levels, namely, a "high level", and an "intermediate level", and a "low level" in the order of amount of log. If the fault occurs in response to the operator's operation, the log detail level changing unit 118 changes the log detail level. For example, the log detail level changing unit 118 changes the log detail level from the "low level" to the "high level" such that the amount of log stored on the log memory 113 increases to be more than the amount of log prior to the occurrence of the fault. If the fault re-occurs in response to the operator's operation, the log detail level changing unit 118 changes the log detail level. For example, the log detail level changing unit 118 changes the log detail level from the "high level" to the "low level" or from the "high level" to the "intermediate level" in order to decrease the amount of log stored on the log memory 113 to be less than the amount of log prior the occurrence of the fault.

If the log detail level is changed from "coarse" to "fine" in the example described above, a log at the log level "DEBUG" is newly generated, thereby increasing the amount of the generated log. The increasing of the amount of the generated log is not limited to this method. If the log detail level is changed from "coarse" to "fine" in accordance with the exemplary embodiment, the amount of the generated log may be increased by setting information on the log at the log level "FATAL" or "ERROR", other than "DEBUG", to be more detailed (increasing an amount of information included in the log) instead of newly generating a log at the log level "DEBUG" or in addition to generating a log at the log level "DEBUG".

In the example described above, the amount of the generated log is determined based on the log detail level or the log level. The method of determining the amount of the generated log is not limited to this method. In accordance with the exemplary embodiment, any method may be employed as long as the amount of the generated log may be changed depending on when the fault occurs in response to the operator's operation or when the fault re-occurs.

In the example described above, the log is generated using the management application that manages the device 200. The exemplary embodiment is not limited to this arrangement. In accordance with the exemplary embodiment, as long as the log is generated using a program, such as an application, and an amount of a generated log is changed when a fault occurs in response to the operator's operation or when a fault re-occurs, any other method may be employed. In the example described above, the fault occurs when the operator operates the management application. As long as the fault occurs in response to the operation on the device serving as the monitoring target, and the log at the occurrence of the fault is generated by the program, such as the application program, the fault is not limited to the one that occurs in response to the operation of the management application.

In accordance with the exemplary embodiment, the method of changing the amount of the generated log (the amount of storage) includes a method of changing from a state in which no log is generated to a state in which a log is generated, and a method of changing from a state in which a log is generated to a state in which no log is generated.

The program that implements the exemplary embodiment may be supplied not only via a communication system but also by supplying a recording medium, such as a compact disk read-only memory (CD-ROM) having recorded the program thereon.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a memory that stores a log related to an operation performed on a device that is a monitoring target; and
   a processor that, if a fault occurs in the monitoring target device in response to an operation performed by an operator, gives an instruction to the memory to change an amount of memory of the log stored on the memory from a first amount of memory to a second amount of memory different from the first amount of memory, and if the fault re-occurs in response to the operation subsequent to the instruction, instructs the memory to change the amount of memory of the log from the second amount of memory back to the first amount of memory, wherein the second amount of memory is larger in amount of logs than the first amount of memory.

2. The information processing apparatus according to claim 1, wherein the processor instructs the memory to change from the second amount of memory back to the first amount of memory if a predetermined condition is satisfied without the fault re-occurring in response to the operation after the amount of memory is changed from the first amount of memory to the second amount of memory.

3. The information processing apparatus according to claim 2, wherein the predetermined condition is that the fault does not occur even if the operation is performed by a predetermined number of times.

4. The information processing apparatus according to claim 2, wherein the predetermined condition is that another operation different from the operation is performed by a predetermined number of times.

5. The information processing apparatus according to claim 2, wherein the predetermined condition is that a predetermined period of time has elapsed since an occurrence of the fault responsive to the operation.

6. The information processing apparatus according to claim 1, wherein the logs in the second amount of memory include a log different in type from the logs in the first amount of memory.

7. The information processing apparatus according to claim 1, wherein the logs having the second amount of memory stored on the memory at an occurrence of the fault responsive to the operation include more information on the fault than the logs having the first amount of memory stored on the memory at the occurrence of the fault responsive to the operation.

8. An information processing apparatus comprising:
   a memory that stores a log related to an operation performed on a device that is a monitoring target; and
   a processor that, if a fault occurs in the monitoring device in response to an operation performed by an operator, instructs the memory to increase an amount of memory of the log stored on the memory to an amount of memory more than an amount of memory prior to an occurrence of the fault, and if the fault reoccurs in the monitoring target device in response to the operation, instructs the memory to reduce the amount of memory of the log stored on the memory to an amount of memory smaller than the amount of memory prior to the occurrence of the fault.

9. An information processing apparatus comprising:
   memory means for storing a log related to an operation performed on a device that is a monitoring target; and
   instruction means for, if a fault occurs in the monitoring target device in response to an operation performed by an operator, giving an instruction to the memory means to change an amount of memory of the log stored on the memory means from a first amount of memory to a second amount of memory different from the first amount of memory, and if the fault re-occurs in response to the operation subsequent to the instruction, instructing the memory means to change the amount of memory of the log from the second amount of memory back to the first amount of memory, wherein the second amount of memory is larger in amount of logs than the first amount of memory.

* * * * *